Aug. 5, 1969   D. D. MacPHAIL, SR   3,459,274
SOUND BARRIER STRUCTURE AND METHOD OF MAKING SAME
Filed July 31, 1967   2 Sheets-Sheet 1
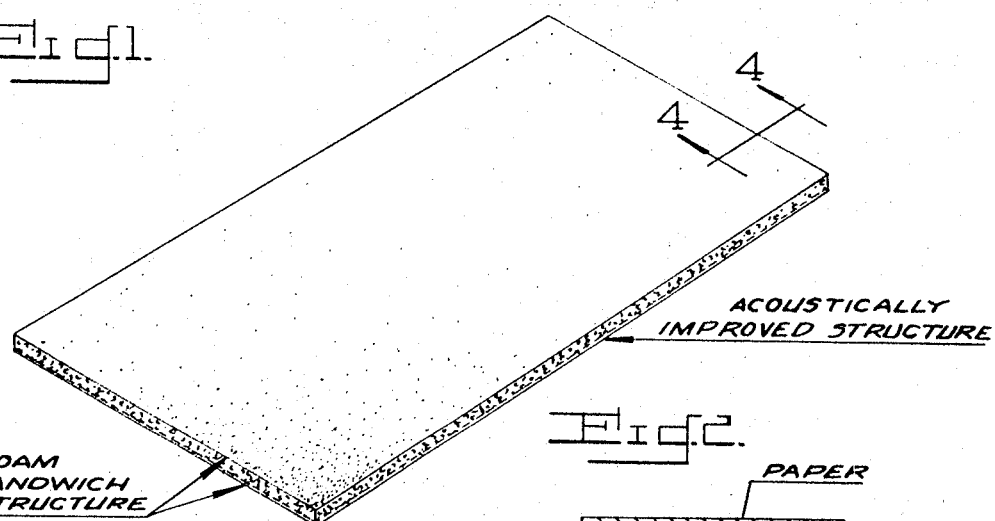
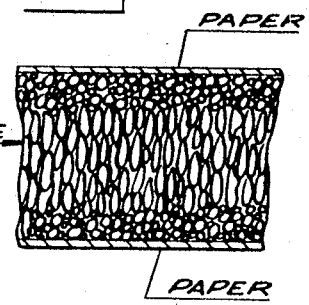
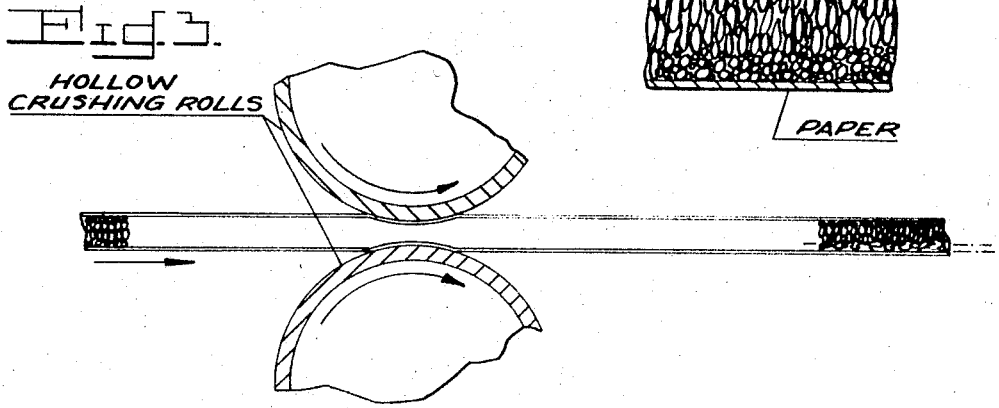
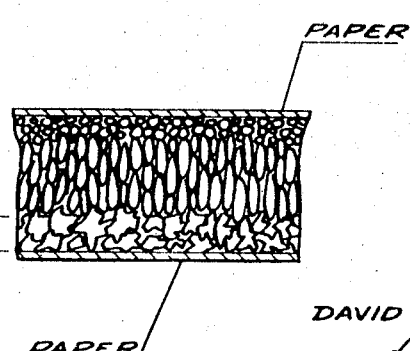
INVENTOR.
DAVID D. MacPHAIL, SR.
BY Paul L. Passley
Attorney

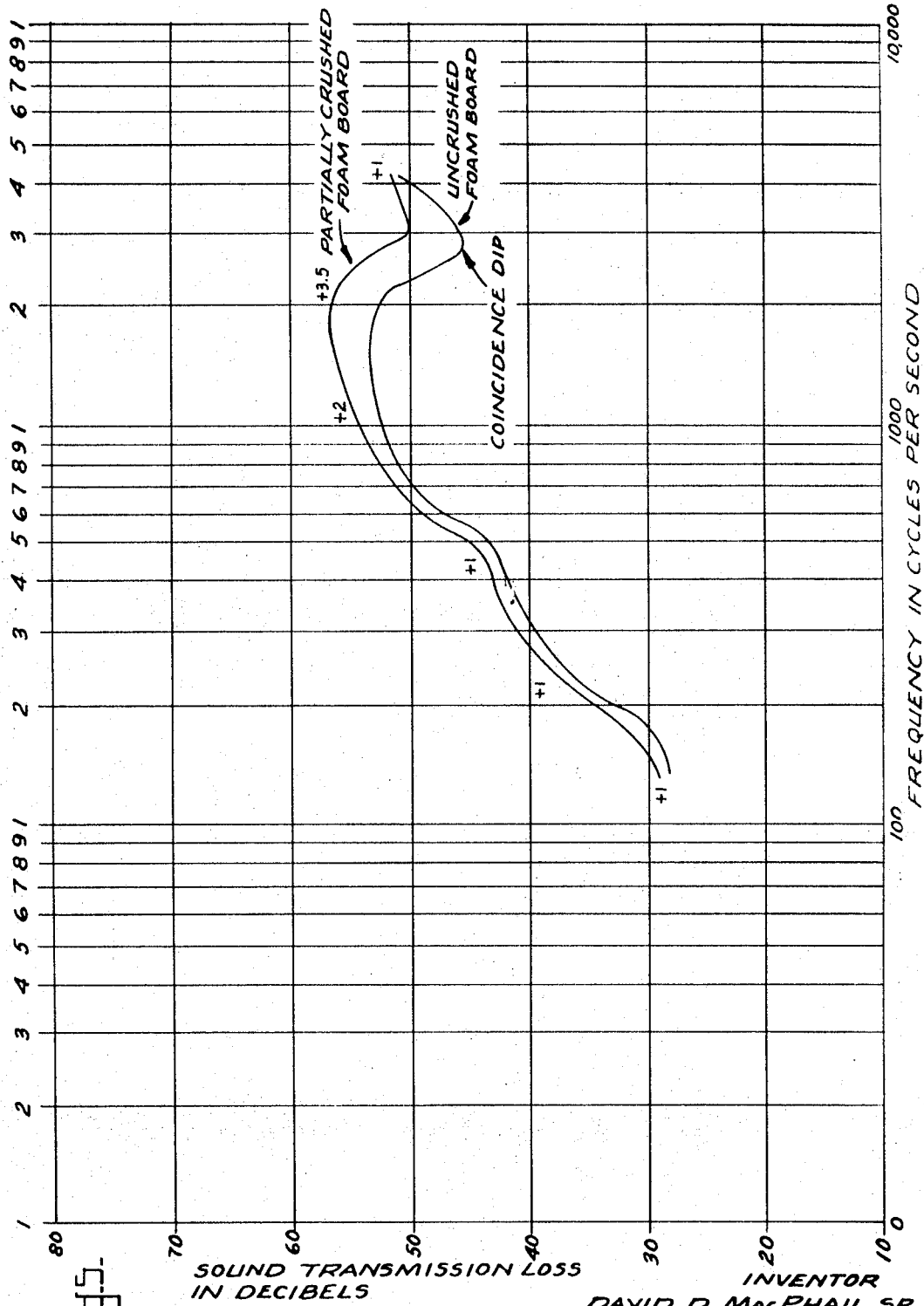

United States Patent Office 3,459,274
Patented Aug. 5, 1969

3,459,274
SOUND BARRIER STRUCTURE AND METHOD
OF MAKING SAME
David D. MacPhail, Sr., Thompsonville, Conn., assignor to Monsanto Company, St. Louis, Mo., a corporation of Delaware
Continuation-in-part of application Ser. No. 571,315, Aug. 9, 1966. This application July 31, 1967, Ser. No. 657,096
Int. Cl. G10k 11/04
U.S. Cl. 181—33                    5 Claims

ABSTRACT OF THE DISCLOSURE

This application describes a foamed thermoplastic product wherein a critical portion of the cell structure of the foam is distorted and/or ruptured. The foamed product has improved acoustical characteristics, i.e., sound transmission resistance and is useful as panels or elements in building constructions. The critical distortion and/or rupture of the foam cell structure is achieved by subjecting the foamed product to controlled partial compression.

This application is a continuation-in-part of copending application Ser. No. 571,315, filed Aug. 9, 1966.

Background of the invention

This invention relates to thermoplastic materials, and particularly to construction materials comprising foamed thermoplastic resins having substantially improved sound attenuation properties.

For many years increasing the mass and density of a wall was considered as being the only way to improve the sound attenuation characteristics of structures, both solid and cellular or reticulated. Approximately 10 years ago, it was found that separating the two halves of a wall construction, as by staggering studs, produced a slight degree of sound reduction, especially if the cavity between the two halves contained a low density sound wave absorbing membrane such as mineral wool. Recently, it has been found that non-homogeneous constructions, such as varying density multiple layer products, improve to some extent the sound damping characteristics of the construction.

It has been appreciated and realized that certain forms of thermoplastic foam construction units have a degree of sound resistance and inhibit to some extent the transmission of noise from one area to an adjacent area. However, known thermoplastic foam constructions are subject to resonant shortcomings which create areas where substantial loss of sound attenuation occurs throughout a broad frequency spectrum.

Summary

This invention is directed to altering a portion of the cell shape characteristics of foamed thermoplastic materials by partial compression thereof and to partially crushed foamed thermoplastic materials.

Accordingly, typical objects of this invention are to provide (1) foamed thermoplastic materials having improved sound attenuation characteristics: (2) construction materials having improved sound attenuation; and (3) a method for altering a portion of the cell shape characteristics of foamed thermoplastic materials to improve their sound attenuation characteristics.

Other objects, aspects and advantages of this invention will become apparent to those skilled in the art upon further study of this dsiclosure, the drawing and appended claims.

In accordance with this invention, the shape characteristics of the cells in a portion of the cell structure of foamed thermoplastic materials are altered by subjecting the foamed material to sufficient compressive force to reduce its thickness of from about 15 to 75 thousandths of an inch. The compression of the foamed material can be achieved by numerous known techniques, such as squeeze rolls, vertically aligned platens, roll-platen combinations, and the like. The degree of compressive force applied to the foamed material is controlled by various known procedures such as the gap setting between squeeze rolls, i.e., the gap is set 15 to 75 thousandths of an inch less than the gauge of the foamed material which is to be compressed.

Although, any form of foamed thermoplastic material may be partially compressed in accordance with this invention to improve its acoustial characteristics, preferably the foamed materials are in a form suitable for direct use as construction materials such as a foam sandwich where the foamed material is enclosed between liner board facings which support the internal foam structure and enable the production of building elements for use in the construction of walls, ceilings, floor units, and the like. The facings of the foam sandwich may be of the same or different materials. Suitable facing materials for such structures include 26# to 60# b.w. jute liner board, 26# to 69# b.w. kraft liner board, 30# to 90# b.w. chipboard liner board, plastic sheets and laminates, linen, reticulated materials, and the like. Of course the foamed material may have a facing on only one side. The facings of the sandwich can be applied to the foam core by heating or adhesive lamination.

Studies have revealed that, especially in the case of polystyrene materials, the center cells in foam sandwich boards tend to be upright columns across the gauge of the product while the cells near the exterior surfaces or facings remain circular in shape and are accordingly particularly amenable to the practice of this invention. When foamed polystyrene products are subjected to the partial crushing treatment of this invention, the outer strata cells of such products tend to become distorted in shape and actually ruptured in many instances. However, due to variance in cell size geometry, techniques employed and differences in physical characteristics of foamed structures, distortion and/or rupture may occur in either of the outer strata areas or, in some cases, in the middle of the foam structure. Cell alteration produced by this invention in the foam structure is essentially continuous throughout the surface dimensions of the structures.

Although the invention is particularly applicable to foams of polymers of styrene and styrene derivatives, such as styrene homopolymers, it also is applicable to rubber modifide styrene polymer blends, acrylonitrile-butadiene-styrene terpolymers (AN=30%:B=10%), modified graft and mechanically blended polymers of styrene, as well as polymeric products of such monomers as vinyl halides, vinylidene halides, vinyl acetate, cellulose ester, ethyl cellulose, acrylic acid esters, methacrylic acid esters, acrylonitrile, ethylene, propylene and higher olefins, isobutylene, halogenated olefins and copolymers, interpolymers, graft polymers, and chlorinated and chlorosulfonated polymers of such polymeric products as well as mixtures of the same. Particularly useful for the practice of this invention and for the development of foamed products having significantly improved sound attenuation characteristics are polystyrene and polymers of styrene. Such materials have been available on the market for a considerable period of time and are used in construction applications.

The improvements in sound attenuation of foamed thermoplastic products obtained by this invention lie within all three sound control mediums, namely, acoustical—sound absorption within a room, airborne sound transmission class type—from one room to the next room, and impact noise—through floor to ceiling constructions.

A critical feature of this invention is the degree of crushing applied to the thermoplastic foams since (1) if the foams are not sufficiently crushed, the sound attenuating characteristics are at most only slightly improved and, in most cases, adversely affected while (2) if the products are over crushed, the sound attenuating characteristics are substantially decreased rather than increased as attained by the practice of this invention. The density characteristics of the foams are also significant factors to be considered. In the case of polystyrene, the density should be from about 1.0 to 7.0 lbs. per cubic foot, and preferable from about 1.5 to 3.0 lbs. per cubic foot. It appears that with densities above 7.0 lbs. per cubic foot, partial crushing of the foam actually increases the density thereof and decreases the acoustical characteristics. Preferred ranges of compression of the foamed material to produce the improved sound attenuation characteristics reside within the area of from about 15 to 75 thousandths of an inch. Following the compression, the residual dimensional characteristics of the foamed material will be altered to an extent of from about 10 to 50 thousandths of an inch of its initial gauge. Internally, cell attenuation, distortion and fracture, based on a one quarter inch foam board, occurs in the area of about 11 percent of the cell structure thickness. As the thickness of the material increases, the percentage internal distortion will be smaller, for example, in the case of a two-inch foam board having outer rigid facings designed to replace studded construction, the percentage of internal distortion can be as low as 0.1 percent.

Another critical feature of this invention is that the thermoplastic foam must be sufficiently aged prior to the critical crushing thereof. The aging of the foam is necessary so that the cell structure is sufficiently rigid in order for the crushing to effectively alter the shape characteristics of the cells. It is necessary that the residual foaming agent contained in the foam be dissipated therefrom because its presence generally tends to soften the thermoplastic material and thereby adversely hinders obtaining the required alteration of the cell shape characteristics. Particularly is this true when the foaming agent employed to foam the thermoplastic is a hydrocarbon such as pentane.

Description of the drawing

This invention will now be described in more detail with reference to the drawing. FIGURE 1 is a perspective view of a foam structure made in accordance with this invention. That portion of the internal cell structure altered in shape characteristics is represented by the dashed line as viewed from the edges. FIGURE 2 is a fragmentary cross-sectional view of a conventional foam board having a foam core sandwiched between paper liner boards. The cell configurations within the foam core are seen as being upright columns in the sub-surface strata of the structure and as circular in the semi-surface stratas. FIGURE 3 is a fragmentary cross-sectional view of a foam board being partially compressed in accordance with this invention. The foam board passes through the nip of matched squeeze rolls which is at a thickness less than the gauge of the foam board. FIGURE 4 is a fragmentary cross-sectional view of a foam board made in accordance with this invention. The alteration of the cell shape characteristics is shown in the lower semi-surface strata of the foam core where the normally circular cells are shown distorted and/or ruptured. FIGURE 5 is a graph showing the substantial and unexpected improvement in sound attenuation of foam board which has been partially crushed in accordance with this invention over the sound attenuation of uncrushed foam board. It will be observed from the graph that a very significant improvement in sound attenuation of the partially crushed foam board is obtained throughout the entire frequency range of from about 125 to 4000 cycles per second. This frequency range is well within the normal audible range for human hearing, and includes (1) voice transmission sound waves which fall approximately within the range of about 400 to 1000 c.p.s., and (2) television and hi-fi sound transmission waves which fall within a range of approximately 20 to 20,000 c.p.s. However, the frequency range most bothersome to human hearing resides in the range of 1500 to 2500 c.p.s. The most significant improvement can be seen from the graph at 2000 to 3000 c.p.s., where a coincidence dip in the normal curve ordinarily occurs. At this point, the angle of sound impedence on the wall sets up a resonant sound path through the wall. The coincidence dip varies depending upon the mass of the facing membranes and the wall panel construction. This coincidence dip exists in the frequency bands of television and hi-fi or phonograph sound generation which is oftentimes considered the most objectionable type, particularly in multi-family dwellings.

Description of preferred embodiments

Several foam board panels are prepared from polystyrene foamed sheet by heat lamination 38# self-extinguishing jute liner board onto each side of the foam sheet. The foam board panels are aged for 2 days to allow dissipation of the pentane which is used as the agent to foam the polystyrene. The panels are classified as ¼ inch boards having a density of 2.0 lbs./cubic foot. One of the aged panels is set aside as a control board and the other panels are passed through the nip of matching squeeze rolls having a gap setting of about 40 thousandths of an inch less than the gauge of the panel. The panels are tested for sound attenuation as follows:

A 2 x 4 frame, 32 square inch with the center stud 1 inch off center (spaces of 15 inch and 17 inch) to minimize any tendency toward panel resonances is supported in a horizontal position above an Altec-Lansing 15-inch coaxial speaker. The speaker is driven from a General Radio White Noise Generator through an Altec-Lansing 50 watt amplifier. A Bruel & Kjaer accelerometer is fastened to one quadrant in the center of the quadrant of a piece of ½ inch gypsum wall board which is laid directly over the 2 x 4 frame and not fastened thereto. Several acceleration measurements are made with a Bruel & Kjaer Sound Level Meter and Octave Band Filter set on the gypsum wall board with interval lifting and replacing the board on the frame to check both the level of vibration produced in the gypsum wall board and to check the consistency of the data. When it is determined that the results are repeatable and consistent, the noise generator is left running at a fixed setting and the several foam board panels as prepared above are tested. In turn, the control panel and each crushed panel is attached to the 2 x 4 frame by a nail in the center of each edge of the panel and a nail in the center of the panel and the above described gypsum wall board is laid over the candidate panel and the sound measurements taken. The measurements are taken at least three times per panel and the results averaged arithmetically. Further description of each pane and the test results obtainable are set forth in table below wherein the measurements for the uncrushed panel (control) are employed as the mean for recording deviations of the measurements of the crushed panels.

TABLE

| Panel identification | | Octave band centering on the frequency (c.p.s.) | | | | | |
|---|---|---|---|---|---|---|---|
| Gauge (thousandths of inch), original, final | Dimensional change (percent) | 125 | 250 | 500 | 1,000 | 2,000 | 4,000 |
| | | Decibel units | | | | | |
| Control, uncrushed | | 0 | 0 | 0 | 0 | 0 | 0 |
| 0.225–0.220 | 11 | +1 | +1 | +1 | +2 | +3½ | +1 |
| 0.235–0.230 | 2 | −2 | 0 | −1 | −1 | −4 | +2 |
| 0.230–0.150 | 35 | −3 | 0 | −2 | 0 | −3 | −3 |

The positive values given above indicate a significant improvement in sound transmission resistance, while the negative values indicate a reduced efficiency in the sound attenuation characteristics of the panels in relation to the control panel. The negative values in the above table show actual depreciation in sound attenuation characteristics over the control panel when the degree of compression imparted to the foam board panel is either too high or too low and outside the limits set forth as critical therefor within this invention.

Referring again to FIGURE 5, the lower line illustrates the sound attenuation of the above tested uncrushed panel (control) while the upper line illustrates the improved sound attenuation of the panels prepared in accordance with this invention over that of the control panel.

The decibel units employed in the above Table 1 and in FIGURE 5 are units of comparative loudness, expressed as tenths of a bel, which is the smallest change in loudness detectable by ear or more technically expressed as "the log of the ratio of the intensities of two sounds." It is generally accepted that a 3-decibel reduction in sound transfer at any frequency gives a sound attenuation improvement of approximately 50 percent, which, of course, is immediately detectable.

It has been found, employing the principles of this invention, that a very significant percentage reduction in sound transmission is obtained within the range of 125 to 4000 c.p.s., while in the area of the coincidence dip the decibel improvement increases to about 3.5 indicating significantly a greater than 50 percent reduction in sound transmission through a ¼ inch polystyrene foam board altered in accordance with the principles of this invention. The data presented above demonstrate conclusively a remarkable and substantial improvement in acoustical characteristics in foam board products prepared in accordance with this invention. The improvement in the octave band centering of 2000 c.p.s. indicates a clear superiority for the partially crushed foam product of this invention for isolating sound.

Although this invention has been herein described and illustrated with respect to particular foamed thermoplastic materials and methods relating thereto, it is to be understood that the materials and methods are representative and not restrictive.

What is claimed is:
1. In a process for the manufacture of thermoplastic foam construction units for sound attenuation by extrusion of said thermoplastic foam, the improvement which comprises the steps of
 (A) aging said thermoplastic foam extrudate, whereby the cell structure of the foam is rigidified and residual foaming agent is dissipated,
 (B) then, partially crushing said thermoplastic foam extrudate whereby its thickness is reduced by about .010 to about .050 inch and distortion is produced in from about 0.1 to about 30 percent of the cell structure thickness.
2. The improved process of claim 1 wherein the thermoplastic foam extrudate is polystyrene foam.
3. The improved method of claim 2 wherein the polystyrene foam has at least one adherent facing sheet of reticulated fibrous material.
4. The improved method of claim 2 wherein the polystyrene foam has at least one adherent facing sheet of linear board.
5. A thermoplastic foam construction unit for sound attenuation manufactured by the improved process of claim 1.

References Cited

UNITED STATES PATENTS

| | | | |
|---|---|---|---|
| 1,371,016 | 3/1921 | Bennett et al. | 161—159 |
| 2,789,095 | 4/1957 | Lindvig. | |
| 2,866,730 | 12/1958 | Potchen et al. | 264—45 XR |
| 2,872,965 | 2/1959 | Sisson | 264—47 |
| 2,899,708 | 8/1959 | Donaldson et al. | 264—321 XR |
| 3,037,897 | 6/1962 | Pelley | 264—321 XR |
| 3,231,439 | 1/1966 | Voelker | 156—79 |
| 3,239,585 | 3/1966 | Karpovich et al. | 264—321 XR |
| 3,311,681 | 3/1967 | Cherney et al. | 264—321 XR |
| 3,386,877 | 6/1968 | Skochdopole et al. | 264—321 XR |
| 3,391,051 | 7/1968 | Ehrenfreund et al. | 264—48 XR |

FOREIGN PATENTS

| | | |
|---|---|---|
| 609,255 | 11/1960 | Canada. |
| 682,025 | 3/1964 | Canada. |

OTHER REFERENCES

C & EN, periodical, issue of June 7, 1965, vol. 43, No. 23, pp. 42, 45, 47 and 48.

ROBERT S. WARD, JR., Primary Examiner

U.S. Cl. X.R.

156—78; 161—160; 264—48, 321